US006554568B2

(12) United States Patent
Fledersbacher et al.

(10) Patent No.: US 6,554,568 B2
(45) Date of Patent: Apr. 29, 2003

(54) EXHAUST TURBOCHARGER FOR AN INTERNAL COMBUSTION ENGINE

(75) Inventors: Peter Fledersbacher, Stuttgart (DE); Siegfried Sumser, Stuttgart (DE); Helmut Finger, Leinfelden-Echterdingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/882,953

(22) Filed: Jun. 15, 2001

(65) Prior Publication Data
US 2002/0004004 A1 Jan. 10, 2002

(30) Foreign Application Priority Data

Jun. 16, 2000 (DE) .......................... 100 29 808

(51) Int. Cl.7 .......................... F01D 17/14; F02D 23/00
(52) U.S. Cl. ...................... 415/166; 415/157; 415/159; 415/914; 415/57.1; 415/58.4; 60/602; 417/407
(58) Field of Search ................. 415/151, 159, 415/157, 158, 166, 167, 57.1, 58.4, 58.6, 914; 417/407; 60/602

(56) References Cited

U.S. PATENT DOCUMENTS

| | | | | |
|---|---|---|---|---|
| 4,212,585 A | * | 7/1980 | Swarden et al. ............ 415/914 |
| 4,719,758 A | * | 1/1988 | Sumser ...................... 415/159 |
| 4,781,530 A | * | 11/1988 | Lauterbach et al. ........ 415/914 |
| 5,466,118 A | * | 11/1995 | Heinrich .................... 415/58.6 |
| 5,707,206 A | * | 1/1998 | Goto et al. ................. 415/914 |
| 6,164,911 A | * | 12/2000 | LeBlanc et al. ............ 415/914 |
| 6,394,751 B1 | * | 5/2002 | Daudel et al. .............. 415/914 |

FOREIGN PATENT DOCUMENTS

| | | |
|---|---|---|
| DE | 42 13 047 | 10/1993 |
| DE | 43 06 689 | 9/1994 |
| DE | 196 47 605 | 5/1998 |
| DE | 198 23 274 | 10/1999 |
| EP | 0 348 674 | 1/1990 |
| EP | 0 811 770 | 12/1997 |
| GB | 2 220 447 | 1/1990 |
| JP | 55 143994 | 7/1980 |
| SU | 1507990 A1 * | 9/1989 |

* cited by examiner

Primary Examiner—Christopher Verdier
(74) Attorney, Agent, or Firm—Klaus J. Bach

(57) ABSTRACT

In an exhaust turbocharger for an internal combustion engine including a turbine and a compressor, which is driven by the turbine, wherein the compressor comprises a compressor impeller in a flow duct, a transfer component with flow passages extends radially around the compressor impeller in the axial direction of the impeller and provides for communication with the flow duct. To provide for variable adjustment of the effective flow cross-section of the transfer duct, a transfer ring is provided which comprises two component rings, which are rotatable relative to one another.

9 Claims, 2 Drawing Sheets

EXHAUST TURBOCHARGER FOR AN INTERNAL COMBUSTION ENGINE

BACKGROUND OF THE INVENTION

The invention relates to an exhaust turbocharger for an internal combustion engine with a turbine and a compressor driven by the turbine and including means for controlling the flow volume delivered by the compressor.

The operating range of compressors in exhaust turbochargers is limited by a surge line and a choke line. These lines denote boundary lines in performance graphs that characterize the behavior of the compressor. When the compressor is operated close to the surge line, there are locally limited separation zones at the blades of the compressor impeller, and these can lead to pulsations of the flow with a periodic reversal of the direction of flow. The surge line of the compressor can be reached when relatively small volume flows are being delivered by the compressor.

When the operating point of the compressor shifts towards large volume flows in the compressor's performance characteristics, however, the choke line may be reached. This is distinguished by blockage of the volume flow at the entrance to the impeller.

In order to extend the operating range of compressors, measures can be taken to stabilize the performance characteristics. These measures shift both the surge line and the choke line towards an extended operating range. One such measure to stabilize the performance characteristics is known, for example, from the publication DE 42 13 047 A1, according to which a bypass is provided in the compressor housing parallel to the compressor inflow duct to bypass one section of the inflow duct. If the compressor is operated in the region of the surge line, the bypass allows controlled recirculation of a mass flow component, which is recirculated in the bypass counter to the delivery direction. The mass flow component is fed back to the main mass flow and returned to the compressor together with the latter.

The choke line too can be shifted to give an extended operating range by stabilizing the performance characteristics. As the volume flows increase, intake air is fed into the compressor because of the additional bypass flow cross-section, thereby shifting the choke line in the direction of larger mass flows.

The disadvantage of the arrangement as shown in DE 42 13 047 A1 is that the measure to stabilize the performance characteristic is integrated in a fixed and invariable manner into the housing of the compressor, without any possibility of adjustment. It is therefore impossible to adapt the flow in the bypass (individually) as a function of the operating point of the compressor.

DE 198 23 274 C1 represents an improvement in this respect. In the compressor described in this publication, an adjustable closure element is provided for variable adjustment of the effective flow cross-section of the bypass. This element is an adjustable guide vane structure comprising two concentrically arranged rings.

It is the object of the present invention to provide, by simple means, a compressor in an exhaust turbocharger for an internal combustion engine with extended performance characteristics.

SUMMARY OF THE INVENTION

In an exhaust turbocharger for an internal combustion engine including a turbine and a compressor which is driven by the turbine, wherein the compressor comprises a compressor impeller in a flow duct, at least one transfer duct extends radially around the compressor impeller in the axial direction of the impeller and provides for communication with the flow duct. To provide for variable adjustment of the effective flow cross-section of the transfer duct, a transfer ring with transfer grooves is provided which comprises two component rings, which are rotatable relative to one another.

Preferably, at least one of the two component rings can be angularly adjusted by means of an actuating element depending on the operating condition of the internal combustion engine. In the overlapping position, the free cross-section of the transfer slot becomes a maximum whereas, in the blocking position, the free flow cross-section is reduced to a minimum, if appropriate to zero. With the component rings being adjustable rotationally relative to one another, the free flow cross-section through the transfer slots at the interface between the two component rings can be adjusted.

The two component rings are advantageously arranged concentrically and radially one within the other. The radially inner component ring is disposed adjacent to the compressor impeller and the radially outer component ring is disposed remote from the compressor impeller. In the overlapping position, the cross-sections of the transfer slots on the radially inner side of the outer component ring overlap with those of the inner ring. The blocking position is achieved by rotation of the two component rings relative to one another, with the two corresponding cross-sections of the associated transfer slots in the inner and outer component rings moving into a position out of radial alignment. In the blocking position, the transfer duct is thus formed solely by the remaining open transfer slot of the inner component ring, which preferably extends radially through the entire wall of the inner component ring.

The free flow cross-section of the transfer slot is substantially determined by the depth of the transfer slot measured in the radial direction. The depth of the transfer slot of the inner component ring is preferably between 10% and 50% of the total depth of both transfer slots, formed by addition of the individual slot depths of the inner component ring and the outer component ring. The maximum possible volume flow through the transfer slot in the blocking position can accordingly be reduced to 10% to 50% of the amount in the overlapping position. Reduction of the free flow cross-section may be considered especially in the operating range between the surge line and the choke line of the compressor performance graph since little or no air recirculation should take place in this stable region of the performance graph so as to avoid impairing optimum air delivery via the compressor impeller.

A plurality of flow slots is advantageously distributed uniformly over the circumference of the two component rings in order for the air flow through the flow slots to be uniform over the circumference. The flow slots may not arranged radially in the component rings but at a particular angle relative to the circumferential direction; they preferably extend tangentially in the component rings. This imparts a desired rotational component to the airflow.

As an alternative or in addition to component rings situated radially one above the other, it may also be appropriate to provide two or more component rings axially one adjacent the other. The flow slot also can be adjusted by rotation of one or more component rings into an overlapping position or into a blocking position. In this embodiment, it is possible, in particular, to manipulate the axial extent of the flow slots. The axially successive component rings can also be combined, if appropriate, with component rings that lie radially one above the other. Finally, it is also possible to arrange more than two component rings radially one above the other and/or axially one behind the other.

Advantages embodiments of the invention will be described below on the basis of the accompanying drawings.

DESCRIPTION OF PREFERRED EMBODIMENTS

Figure 2:
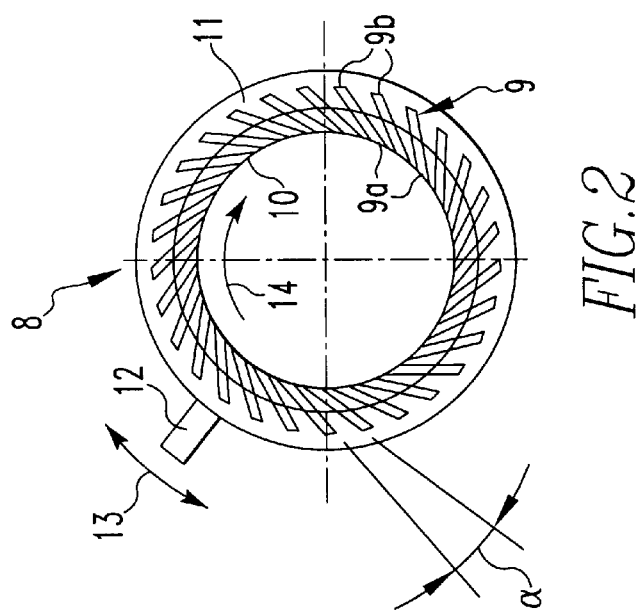
FIG. 2 shows, in side view, the transfer ring comprising two concentric component rings lying radially one above the other.

In the descriptions that follow, identical components are provided with identical reference numerals.

Figure 1:
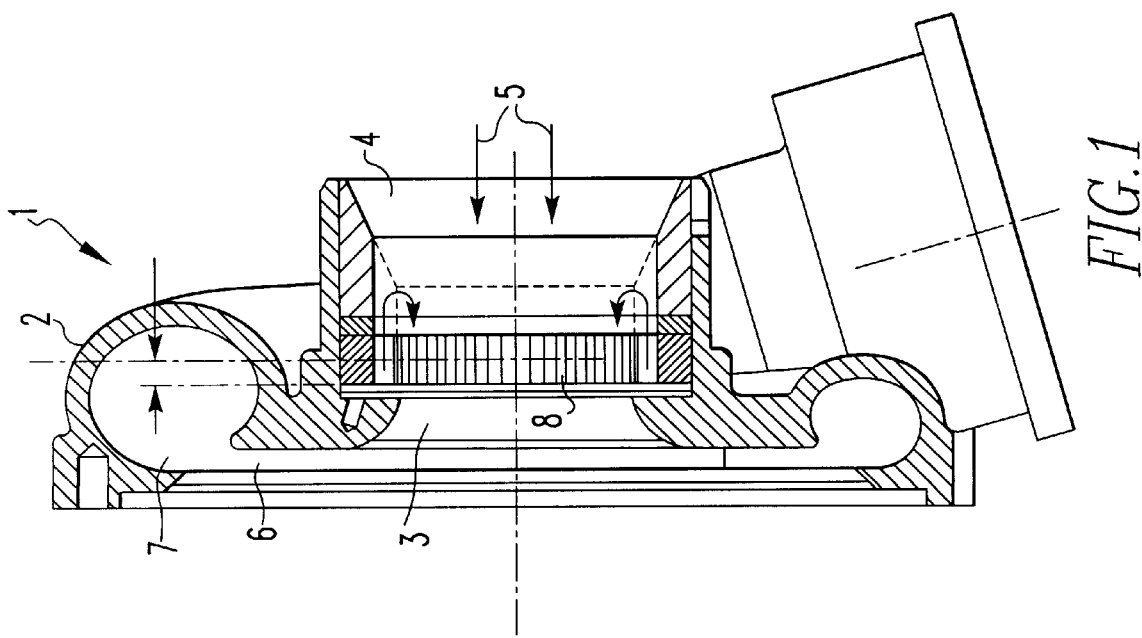
FIG. 1 is a cross-sectional view of a compressor with an adjustable transfer ring in an exhaust turbocharger of an internal combustion engine.

The compressor 1 illustrated in FIG. 1 forms part of an exhaust turbocharger for an internal combustion engine, e.g. an Otto engine or a Diesel engine. The compressor 1 is designed as a radial compressor and, in a housing 2, has a compressor impeller 3, which is arranged rotatably in a compressor flow duct 4 of the housing 2. Rotation of the compressor impeller draws fresh air into the compressor flow duct 4 axially in the direction of arrows 5 and compresses it to an increased boost air pressure. After compression, the boost air is passed via a diffuser 6 into a spiral duct 7 in the housing 2 of the compressor 1. The boost air emerging from the spiral duct is fed to the internal combustion engine.

Arranged in the compressor flow duct 4 concentrically with the compressor impeller 3, is a transfer ring 8 surrounding the compressor impeller 3 radially. Provided in the transfer ring 8 are transfer slots, via which air can be carried essentially co-axially to the compressor flow duct 4. The transfer slots in the transfer ring 8 form a bypass to the compressor flow duct 4, by means of which it is possible to extend the operating range of the compressor between the surge line and the choke line of the compressor performance graph. The effective flow cross-section of the transfer slots can be adjusted to ensure that the behavior of the flow through the transfer slots in the transfer ring 8 matches the various operating conditions of the compressor.

FIG. 1 illustrates recirculation of a mass flow component of the fresh air that flows counter to the main direction of flow 5 and subsequently is reintroduced into the main flow. The axial transfer slots in the transfer ring 8 can be used to divert, recirculate and reintroduce the mass flow component. The operating range illustrated with a mass flow component guided counter to the main direction of flow is implemented when operating the compressor in the region of the surge line. When the compressor operates in the region of the choke line, a mass flow component is likewise passed axially through the transfer slots of the transfer ring 8 but in the same direction as the main direction of flow 5 of the flow of fresh air flowing into the compressor flow duct 4. In the large operating range between the surge line and the choke line, flow through the transfer slots is prevented or reduced to a minimum. This is advantageously achieved by limiting the cross-section of the transfer slots.

FIG. 2 is a side view of a transfer ring 8. The transfer ring 8 is of two-part construction and has a radially outer component ring 11, which surrounds the inner component ring 10. The inner component ring 10 is preferably fixed in relation to the housing, while the outer component ring 11 is preferably rotatably supported on the inner component ring 10 and can be rotated in the direction of arrow 13 relative to the inner component ring 10. Connected to the outer component ring 11 is an actuating element 12 by which the outer component ring 11 can be adjusted as a function of the operating conditions of the internal combustion engine or compressor and/or the turbine of the exhaust turbocharger.

In both, the inner component ring 10 and the outer component ring 11 of the transfer ring 8, there is a plurality of transfer slots 9, which are distributed uniformly over the circumference. They are disposed at a defined angle of between 0 to 90° with respect to the circumferential direction and at an angle of 90 to 180° to the circumferential direction for counter-directional swirl in the transfer ring 8 and, in particular, extend over the entire axial length of the transfer ring 8. Each transfer slot 9 comprises an inner portion 9a, which advantageously completely penetrates the inner component ring 10 radially, and an outer portion 9b in the outer component ring 11. The inner portion 9a and the outer portion 9b of each flow slot 9 are matched to one another in such a way that there is at least one radial position of the outer component ring 11 in which in each case one inner portion 9a and one outer portion 9b of the transfer slots are in alignment. This position is referred to as the overlapping position of the two component rings 10 and 11. If, on the other hand, the outer component ring 11 is turned in the direction of arrow 13 out of the overlapping position shown in FIG. 2, the associated portions 9a and 9b of the transfer slots 9 move out of alignment. This position is referred to as the blocking position of the component rings 10 and 11. In the over-lapping position, each transfer slot 9 has a maximum cross-section, which is formed by a combination of the individual cross-sections of the inner portion 9a and the outer portion 9b. In the blocking position, on the other hand, only the inner portions 9a of the transfer slots are effective and only this inner portion 9a takes part in the bypass flow parallel to the compressor flow duct.

Preferably, the transfer slots 9 in the transfer ring 8 are sloped relative to the circumferential direction. This has the advantage that the transfer slots can have a larger cross-sectional area for a given wall thickness of the two component rings 10 and 11 than would be the case if the transfer slots were to extend only radially.

Figure 3:
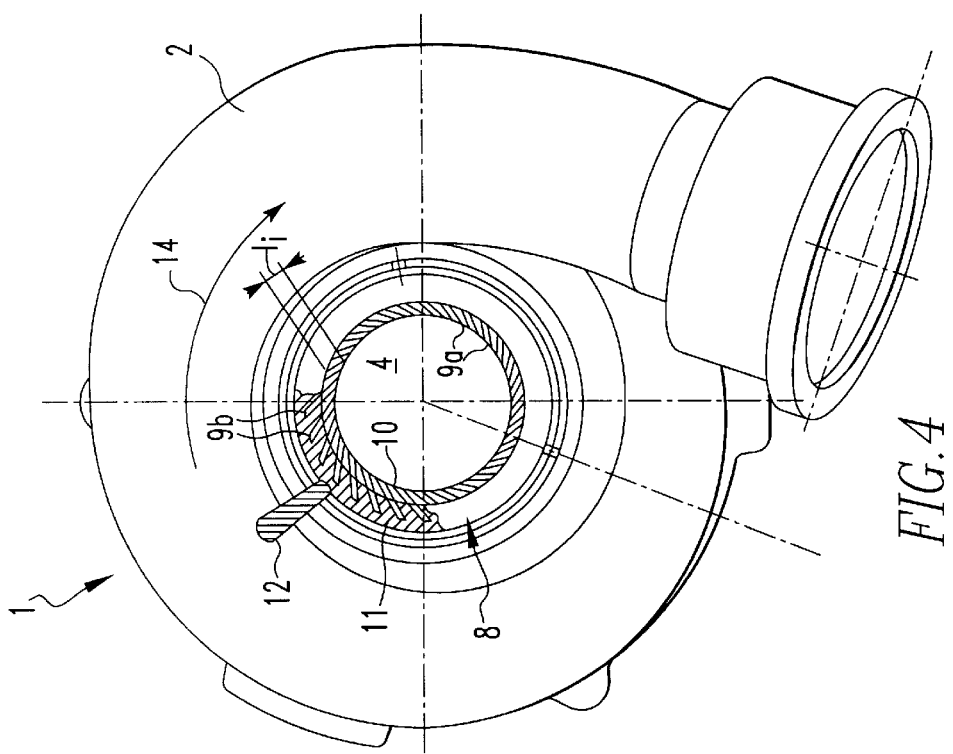
FIG. 3 is a side view of the compressor with the two component rings of the transfer ring in the overlapping position.
Figure 4:
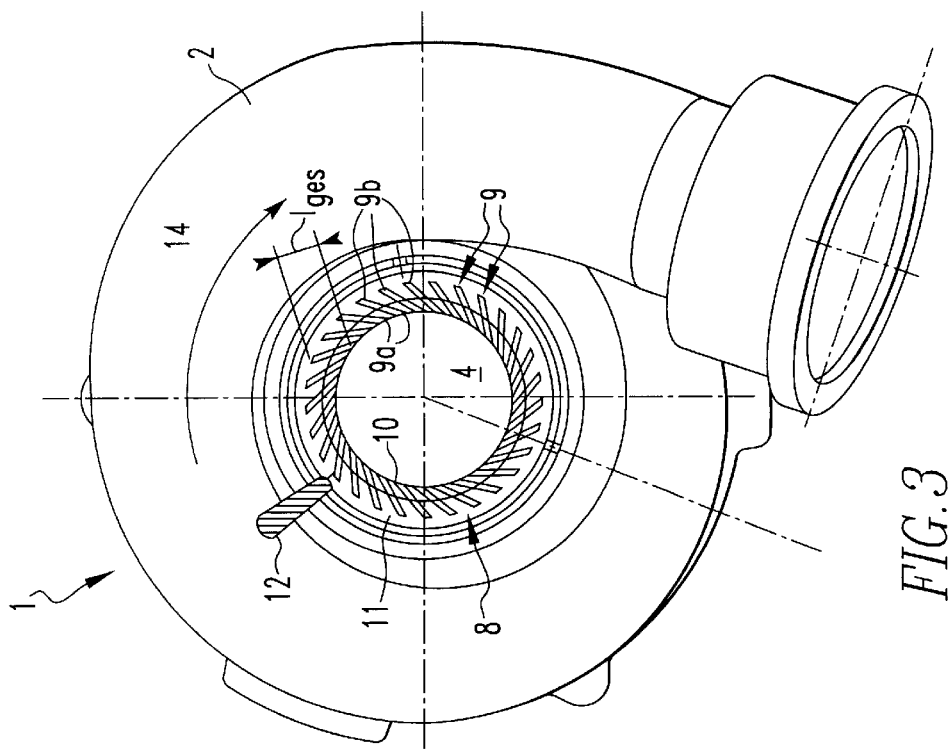
FIG. 4 is a view corresponding to that of FIG. 3, with the outer component ring of the transfer ring rotated into the blocking position.

FIGS. 3 and 4 each are a side view of the compressor 1 with a transfer ring 8, which surrounds the compressor impeller. The component rings 10 and 11 of the transfer rings 8 are in the overlapping position in FIG. 3 and in the blocking position in FIG. 4. The inner portions 9a of the flow slots in the inner component ring 10 are open radially inwards towards the compressor impeller's flow duct 4 over the entire axial length of the component ring 10. According to FIG. 3, the slot depth $1_{ges}$, measured in the tangential direction, is effective in the overlapping position. In the blocking position, shown in FIG. 4, only the inner portions 9a of the transfer slots are effective with a slot depth $1_i$, measured in the tangential direction. The outer portions 9b of the transfer slots remain inoperative owing to the position out of engagement or blocking position. The slot depth $1_i$ of the inner portions 9a of the flow slots is advantageously between 10% and 50% of the total slot depth $1_{ges}$, which is formed by addition of the component slot depths of the inner portion 9a and outer portion 9b of the flow slots.

A preferably automatic adjustment of the degree of overlap between the component rings 10 and 11 as a function of the operating condition of the internal combustion engine or of the charger is possible by means of the actuating element 12.

What is claimed is:

1. A compressor for an exhaust turbocharger of an internal combustion engine, said compressor being a radial compressor and including a housing with an axial inlet area and a radial outlet area, a compressor impeller disposed in a compressor flow duct of said housing, a transfer component extending around the compressor inlet area of said impeller and including two component rings with transfer slots arranged directly adjacent said impeller and being open toward said impeller over their full axial length so as to be in communication with the compressor flow duct, said component rings being rotatable relative to each other for adjustment of the effective axial flow cross-section of said flow slots between an aligned overlapping position, in which the transfer slots in the two component rings are in alignment, and a blocking position, in which the transfer slots in the component rings are at least partially out of alignment.

2. A compressor according to claim 1, wherein each of said component rings includes a plurality of transfer slots uniformly distributed over the circumference of the component rings.

3. A compressor according to claim 1, wherein the transfer slots extend in the component rings at an angle ($\alpha$) of 0° to 90° to the circumferential direction.

4. A compressor according to claim 1, wherein the transfer slots extend in the component rings so as to form an angle ($\alpha$) of 90° to 180° to the circumferential direction.

5. A compressor according to claim 1, wherein the component rings are arranged concentrically and radially, one adjacent the other, so as to form an inner component ring disposed adjacent to the compressor impeller and an outer component ring being remote from the compressor impeller.

6. A compressor according to claim 5, wherein the transfer slots in the outer component ring have a depth which, measured in the radial direction, extends approximately as far as the center of the outer component ring.

7. A compressor according to claim 5, wherein the transfer slots in the inner component ring have a depth which, measured in the radial direction, is between 10% and 50% of the total depth of the transfer slots of the inner and outer component rings.

8. A compressor according to claim 5, wherein the inner component ring is arranged fixed in relation to the housing, and the outer component ring is rotatable around the inner component ring.

9. A compressor according to claim 1, wherein at least one component ring is adjustable by means of an actuating element as a function of the operating condition of the internal combustion engine.

\* \* \* \* \*